D. M. WESTON.
SELF OILING HUB FOR PULLEYS, &c.

No. 75,323.　　　　　　　　　Patented Mar. 10, 1868.

Witnesses.

P. T. Dodge.

Inventor. D. M. Weston
by Dodge & Munn
attys.

United States Patent Office.

DAVID M. WESTON, OF BOSTON, MASSACHUSETTS.

*Letters Patent No. 75,323, dated March 10, 1868.*

IMPROVEMENT IN SELF-OILING HUBS FOR PULLEYS, &c.

*The Schedule referred to in these Letters Patent and making part of the same.*

TO ALL WHOM IT MAY CONCERN:

Be it known that I, DAVID M. WESTON, of Boston, in the county of Suffolk, and Commonwealth of Massachusetts, have invented a new and improved Self-Oiling Hub for Loose Pulleys and wheels of every description.

The nature of my invention consists in making a chamber in the hub, as a receptacle for the oil, connecting with the shaft or axis in the centre of the hub, and provided with one or more longitudinal partitions, which carry the oil, with every revolution of the pulley, at slow speed over and around the shaft, and in direct contact with it.

To enable others skilled in the art to make and use my invention, I will proceed to describe its construction and operation, reference being had to the annexed drawings, making a part of this specification, in which—

Figure 1:
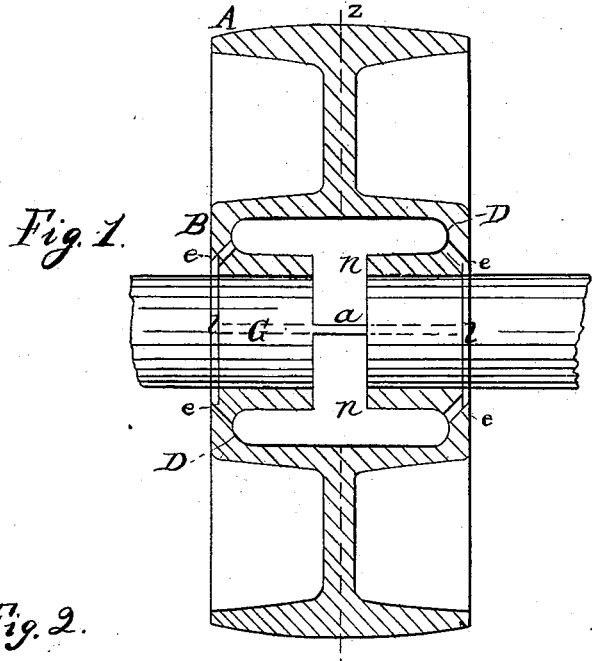
Figure 1 is a longitudinal section, taken on the line $x\ x$ of fig. 2.
Figure 2:
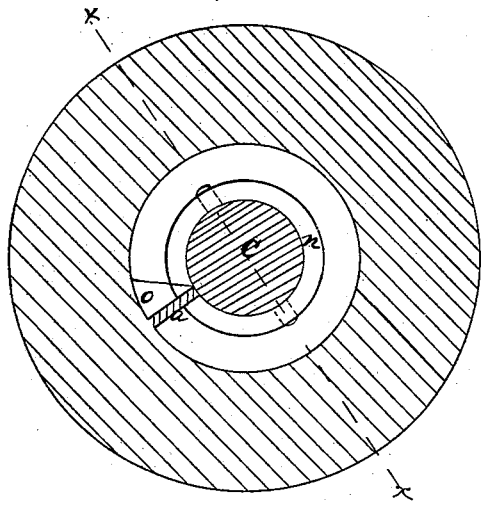
Figure 2 is a transverse section, taken on the line $z\ z$ of fig. 1.
Figure 3:
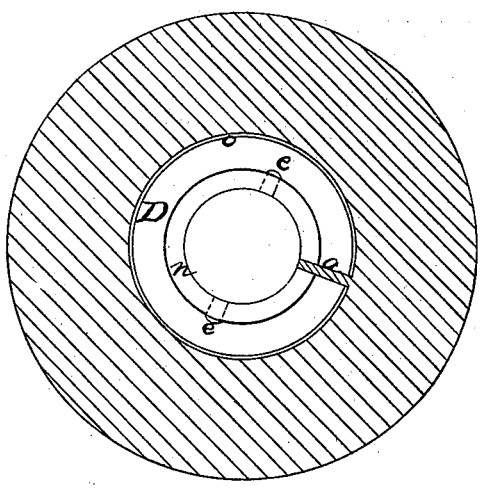
Figure 3 is a similar view, representing the pulley in a different position, and as operating at increased speed.

Pulleys have heretofore been made with a chamber in the hub for containing the lubricating-material, and having the passages for conducting the lubricant from said chamber to the shaft filled with fibrous material, through which the oil had to soak in order to reach the shaft. Experience has demonstrated that, when thus arranged, the fibrous material soon becomes filled or clogged up with the residuum of the oil, and the gummy matter and dirt which accumulate within the hub and on the journal, and thereby prevent the flow of the oil from the chamber to the journal or shaft. To remedy this difficulty, and provide a pulley with a sure and efficient means of self-lubrication, I construct and arrange my device in the following novel manner:

I construct a pulley or wheel, as the case may be, in any of the usual methods, and provide it with a hub of sufficient size to have formed in it circumferential chamber D, as represented in figs. 1, 2, and 3. This chamber D has connecting with it a narrow passage, E, which extends from the chamber D directly through into the hole in the centre of the pulley, into which the journal or shaft is inserted, as shown in fig. 1; this passage E and chamber D extending all around, with the exception of a partition, $a$, which extends entirely across the chamber D, as represented by the dotted lines in fig. 1, and which also protrudes into and extends across the passage E, as represented in figs. 2 and 3, its inner edge extending in, flush with the inner surface of the hub, so as to come in contact with the journal on which the pulley is mounted, as represented in fig. 2; I being the journal. In each end of the hub I form a dove-tailed recess, $l$, as represented in fig. 1, this recess being circumferential, and of suitable depth to permit the insertion of an oil-can nozzle. From these recesses $l$, holes, $e$, extend in to the chamber D, as represented in fig. 1. It is obvious, however, that it is not necessary to form the recess $l$ in both ends, except for convenience in getting the oil into the chamber from either side, as, in some instances, the pulley will necessarily be so located that it can be got at only from one side.

With a pulley or wheel-hub thus constructed, it will readily be seen that oil may be introduced into the chamber D at any time, whether the pulley be stationary or moving. If stationary, it is only necessary to turn it around until one of the openings, $e$, comes below, as represented in fig. 1, when the oil can be at once poured through it into the chamber D. When the pulley is moving, the oil being poured into the recess $l$ will be forced outward by the centrifugal force, and will gradually work through the holes $e$ into the chamber D. The oil being in the chamber, will, of course, gravitate at its lowest point when the pulley is stationary, as represented by $s$ in fig. 1, but as the pulley begins to move, the oil will be carried by the partition $a$ around with it, and, as it assumes the position indicated by fig. 2, the oil will flow through the opening E on to the journal I, and this will be repeated until the velocity of the pulley becomes such that the oil will be thrown and held against the outer wall of the chamber D by centrifugal force, as represented by $o$ in fig. 3. As the pulley slows or moves with less rapidity again, the oiling process will be repeated, the same as when it first starts. It is obvious that with heavy and slow-moving wheels, or in those of large diameter, where the hub revolves at a comparatively low speed, the oil will be kept constantly in contact with the journal, or will at least be brought into contact with it at each revolution, as represented in fig. 2, and thus the lubrication will not only be automatic, but it will also be automatically varied to adapt itself to the varying conditions of the machinery, the lighter and rapidly-running pulleys receiving less, and the heavier and slower-moving wheels receiving more lubrication. It is, however, obvious that by filling the chamber D sufficiently full of oil, the latter may be kept in constant contact with the journal.

Having thus described my invention, what I claim, is—

1. A loose wheel or pulley, having its hub provided with the chamber D, and opening E, with the partition $a$, or its equivalent, when constructed and arranged to operate substantially as described.

2. In combination with the chamber D, I claim the dove-tailed recess $l$, with the passages $e$, leading into said chamber, substantially as and for the purpose set forth.

D. M. WESTON.

Witnesses:
    AUGUSTUS RUSS,
    J. M. F. HOWARD.